(12) United States Patent
Burr et al.

(10) Patent No.: US 7,890,715 B2
(45) Date of Patent: Feb. 15, 2011

(54) SUSPENSION OF AN ASYNCHRONOUS REMOTE COPY PAIR SYSTEM HAVING A PRIMARY CONTROLLER AND A REMOTE CONTROLLER

(75) Inventors: Dale Burr, Hampshire (GB); Robert Bruce Nicholson, Hampshire (GB); Carlos Francisco Fuente, Hampshire (GB); William James Scales, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 661 days.

(21) Appl. No.: 11/934,370

(22) Filed: Nov. 2, 2007

(65) Prior Publication Data

US 2008/0109621 A1 May 8, 2008

(30) Foreign Application Priority Data

Nov. 7, 2006 (GB) .................................. 0622140.2

(51) Int. Cl.
G06F 12/00 (2006.01)
(52) U.S. Cl. ............................ 711/162; 711/161; 714/6
(58) Field of Classification Search ................. 711/162, 711/161; 714/6
See application file for complete search history.

(56) References Cited

U.S. PATENT DOCUMENTS

| 7,055,059 | B2 | 5/2006 | Yanai et al. | |
|---|---|---|---|---|
| 7,251,743 | B2* | 7/2007 | Chen et al. | 714/6 |
| 2004/0034808 | A1* | 2/2004 | Day et al. | 714/6 |
| 2004/0260899 | A1* | 12/2004 | Kern et al. | 711/162 |
| 2005/0114562 | A1* | 5/2005 | Barnes et al. | 710/29 |
| 2005/0204105 | A1* | 9/2005 | Kawamura et al. | 711/162 |
| 2007/0038825 | A1* | 2/2007 | Kawamura et al. | 711/162 |

* cited by examiner

*Primary Examiner*—Hong Kim
(74) *Attorney, Agent, or Firm*—Century IP Group, Inc.; F. Jason Far-hadian, Esq.

(57) ABSTRACT

This invention relates to an asynchronous remote copying (ARC) system adapted to operate as a remote copy pair by communicating between primary storage and remote storage of a remote copy pair. The system comprises a primary controller for receiving a write command and writing data to primary storage; a remote controller for receiving a write command and writing data to remote storage; an ARC controller for suppressing the release of the write command to the remote controller if a delay between receiving the write command and the time when the remote storage may accept the data is more than a threshold delay, and the primary controller suppresses recording the data in primary storage until release of the write command to the remote storage.

18 Claims, 2 Drawing Sheets

SUSPENSION OF AN ASYNCHRONOUS REMOTE COPY PAIR SYSTEM HAVING A PRIMARY CONTROLLER AND A REMOTE CONTROLLER

CROSS REFERENCE TO RELATED APPLICATIONS

Pursuant to 35 U.S.C. §119(a), this application claims the benefit of earlier filing date and right of priority to British Patent Application No. 0622140.2, filed on Nov. 7, 2006, and abandoned in February 2007, the content of which is hereby incorporated by reference herein in its entirety.

TECHNICAL FIELD

The present invention relates generally to an asynchronous remote copying (ARC) system and, more particularly, to a storage control system adapted to operate as a remote copy pair by communicating between a primary controller and a remote controller of the remote copy pair.

BACKGROUND

Remote copying is the pairing of a primary data storage system with a remote data storage system for use in disaster recovery or as a backup. Whenever data is written to the primary data storage system it is also written to the remote data storage system to ensure the backup stays up-to-date. The typical use of remote copy is to place the remote data storage system at a site which is physically separate from the primary data storage system so that it is not affected by events such as fire, flood, loss of electrical power, or network failure that may make the primary data storage system unavailable or destroy it.

In synchronous remote copying, the host does not receive a completion notice for a write operation until the write has been committed to both the primary and the remote data storage systems. This limits the distance between the primary and remote volumes typically to a few hundred kilometers because the time taken to send a message from the primary site to the remote site and to receive a reply for the message is experienced by the host as additional write response time. At longer distances, the additional write latency results in unusually slow application performance.

In asynchronous remote copying (ARC), the host that writes the data to the primary is not usually delayed while data is copied to the remote; as soon as the data has been written to the primary, the host is notified of the completion. The data is then copied to the remote asynchronously. This means that ARC solutions may be deployed in configurations where the distance between the primary and secondary is many thousands of kilometers and the latency may be many tens of milliseconds. Note that in order for the data at the remote to be useful it is important that the system orders writes at the remote so that, at all times, the data there matches the data that could have been at the primary at some point in the past.

An ARC implementation, while able to tolerate a highly latent link having a very long round trip delay perhaps of several hundred milliseconds, may nevertheless be intolerant of bandwidth limitation in the link or in the storage controllers at the remote site. The effect of poor bandwidth may cause writes to the primary volumes to be delayed. An example of intolerance may be where an ARC implementation requires memory resources at the primary site to track writes which are due to be committed at the secondary. These resources are retained until the corresponding write is committed at the secondary.

SUMMARY

The present disclosure is directed to systems, methods and corresponding products that facilitate the suspension of an asynchronous remote copying system.

In accordance with one embodiment, a method for storing data in an asynchronous remote copy (ARC) system comprises receiving a write request to write data to a primary storage medium; buffering the data using an ARC controller, while monitoring a time delay. The time delay is determined based on the difference between the time a primary controller receives the write request until a remote controller indicates that the remote controller will write a copy of the data to a remote storage medium.

In one embodiment, the primary controller writes the data to the primary storage medium, in response to the ARC controller determining that the time delay is less than a predetermined threshold. The primary controller may suspend writing the data to the primary storage medium, in response to the ARC controller determining that the time delay is greater than the predetermined threshold. The remote controller may write a copy of the data to the remote storage medium, in response to the ARC controller determining that the time delay is less than a predetermined threshold.

In one embodiment, writing the data to the primary storage medium by way of the primary controller may be suspended until the ARC controller determines that the time delay is less than a predetermined threshold. The primary controller may forward a write completion notice to a host submitting the write request and the remote controller may forward a write completion notice to the ARC controller, respectively, when the data is successfully written to the primary storage medium and a copy of the data is written to the remote storage medium. The ARC controller may monitor the time delay by determining whether a cumulative delay, associated with a series of delays between receiving the write request at the primary controller and the time when the remote controller indicates that the remote controller will write a copy of the data to the remote storage medium, are over a threshold period According to one aspect of the invention, a storage control system is configured to operate as a remote copy pair by communicating between a primary controller and a remote controller of the remote copy pair. A primary controller is configured to receive a write command and to write data to primary storage. A secondary controller is configured to receive a write command and to write data to remote storage. An ARC controller is configured to suppress the release of the write command to remote controller if a delay between receiving the write command and the time when the remote storage may accept the data is more than a threshold delay; wherein the primary controller suppresses recording the data in primary storage until release of the write command to the remote storage.

According to another aspect of the invention, a method of asynchronous remote copy (ARC) of data between primary storage and remote storage comprises sending a primary write command to a primary controller and sending an ARC write command to an ARC controller; suppressing the release of the ARC command from the ARC controller if a delay between the time associated with sending the ARC write command to the ARC controller and the time when the remote storage may accept the data is more than a threshold; and recording the data at the primary storage upon release of the ARC command to the remote storage.

The invention may allow suppression of the ARC relationship after degradation of the primary IO. In one embodiment, a user adjustable setting in the ARC implementation is provided that allows the user to specify the threshold, for example, how long the user will tolerate degradation of the primary IO before the ARC relationship may be suspended.

When the implementation of ARC starts to impact the performance of writes at the primary, some users may value performance at the primary more than they value the continued operation of the ARC. These users may want the ARC relationship to suspend rather than impacting performance at the primary. When the relationship suspends, the ARC implementation stops sending write data to the remote data storage and the lag at the remote site increases as time goes buy until the relationship is restarted. Typically suspending and restarting an ARC relationship carries a penalty of requiring more data to be transferred when the relationship is restarted or requiring a period of loss of synchronisation.

Other users may value the continuous operation of the ARC and tolerate any amount of performance degradation at the primary. The majority of users may fall between these two extremes and may tolerate some degree of performance degradation before they allow the ARC to suspend.

In accordance with one aspect of the invention, a system comprising one or more logic units is provided. The one or more logic units are configured to perform the functions and operations associated with the above-disclosed methods. In yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments

DETAILED DESCRIPTION OF EXEMPLARY EMBODIMENTS

Figure 1:
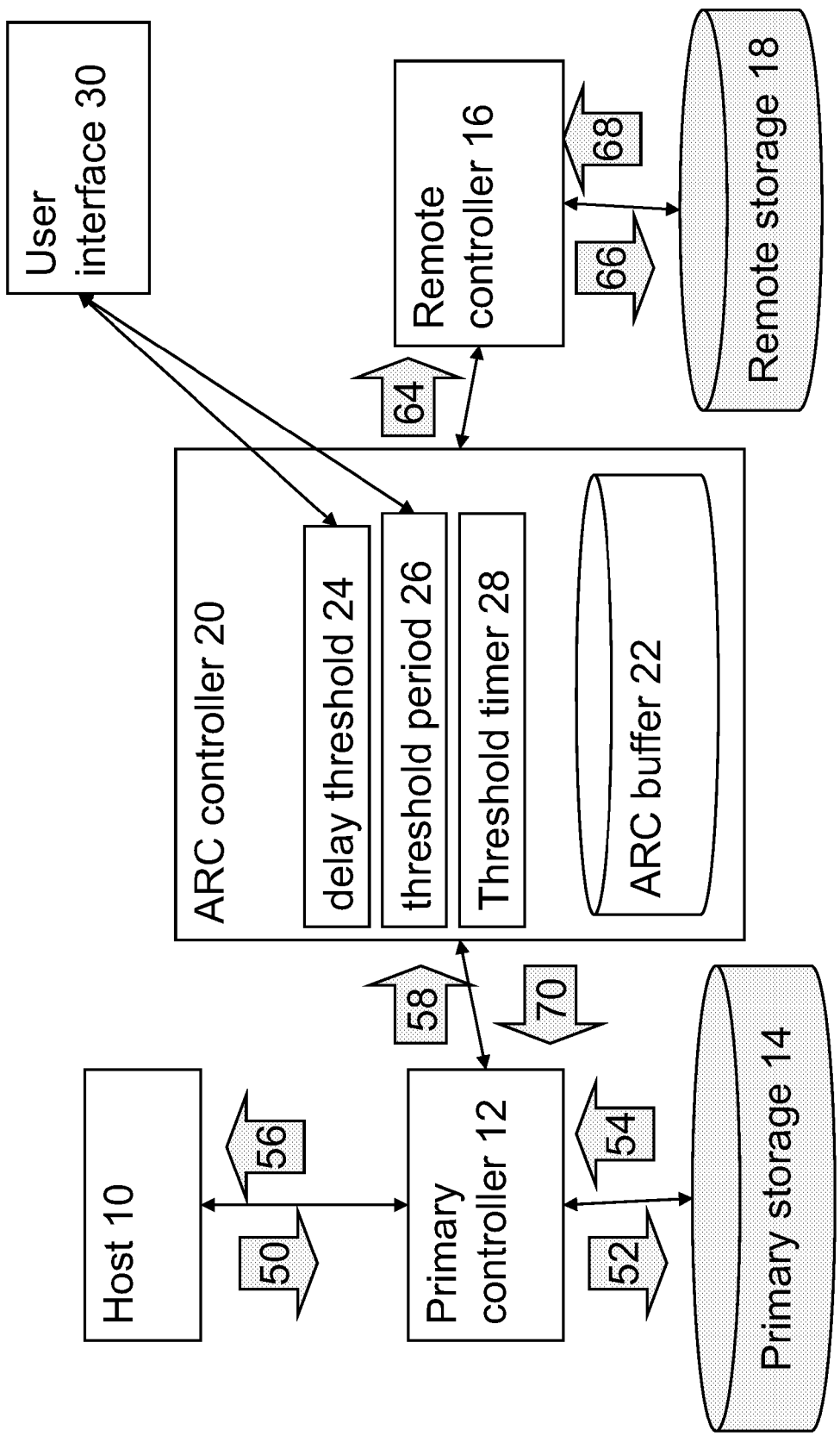
FIG. 1 is a block diagram of an asynchronous remote copying system according to one embodiment.

Referring to FIG. 1, a host 10 may write to a primary controller 12 having primary storage 14. The primary controller 12 may use the ARC technique to replicate the data to a remote controller 16 which writes the data onto remote storage 18, such as a disk storage system. Linked between the primary controller 12 and the remote controller 16 is an ARC controller 20 having an ARC buffer 22. In one embodiment, the ARC controller 20 may use a threshold timer 28 to determine the delay between receiving a write command at the ARC controller and when the remote controller 16 may accept the write data. The ARC controller may determine if this delay exceeds a delay threshold.

The delay may be determined by tracking the resources that are available. For example, remote controller 16 may be able to accept the write data, when the ARC controller 20 tracks the resources that are available at the remote controller 16 versus the resources being used for writes that are in progress. The resources available may be established as part of the initialization process for the communications between remote controller 16 and ARC controller 20. Resources are consumed by writes that are in progress from point 58, when ARC buffers the write data and until the ARC controller receives acknowledgement that the write has completed at the remote controller 16.

Alternatively, the delay may be determined by the delays experienced as the result of preceding accesses. In one embodiment, the ARC controller 20 may use the threshold timer 28 to determine whether consecutive multiple write commands each have a delay over a delay threshold 24, and whether the cumulative delay is beyond a threshold period 26. In case of a disruption of communication between primary ARC controller 20 and remote controller 16, prolonged periods of increased latency may be detected.

In one embodiment, to avoid delay or disruption of service to host applications, the ARC controller 20 may suppress release of the data from the ARC buffer 22 to the remote controller 16. The primary controller 12 may not write the data to the primary storage 14 until the ARC controller 20 has released the delay at the remote storage 18.

Figure 2:
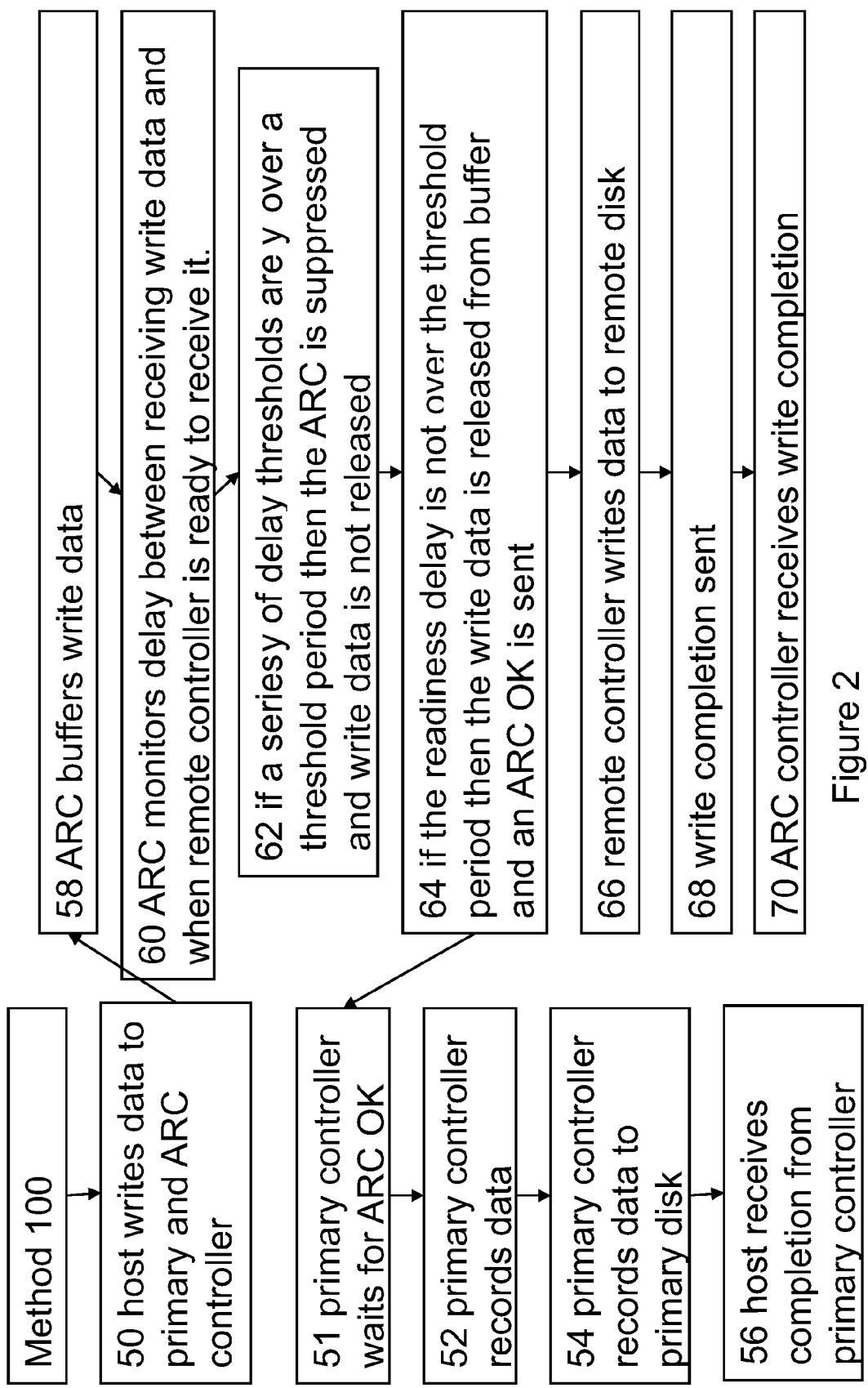
FIG. 2 is a flow diagram of a method for managing the components of an asynchronous remote copying system, according to an exemplary embodiment.

Referring to FIG. 2, a method 100 for managing the components of an ARC system in accordance with one embodiment is provided. Processes illustrated in blocks 50 through 56 may be performed in the primary controller 12 and the processes illustrated in blocks 58-70 may be performed by the ARC Controller 22. In process 50, the host 10 sends a write command and data to the primary controller 12 and ARC controller 20. In process 51, the primary controller 12 waits for an acknowledgement signal from the ARC controller 20 before continuing to store the data to primary storage 14. The acknowledgement signal is an acknowledgement that the ARC controller 20 is proceeding because the remote controller 16 is ready to receive the write data.

Once the acknowledgement signal is received by the primary controller 12, process 52 may be started. In one embodiment, the acknowledgment may be an indication that the remote controller 16 has indicated that it is ready to receive the data to be written to remote storage 18, for example.

In process 52, in response to receiving the acknowledgement, the primary controller 12 records the data in primary storage 14. Primary storage 14 may comprise a data storage system comprising, for example, one or more non-volatile memory devices such as hard disk drives, tape, optical disk, or other suitable storage devices. In one embodiment, data may be written directly to primary storage 14. In another embodiment, the data storage system 14 may comprise a RAID array or cache which is replicated to protect against loss of power.

In process 54, the primary controller 12 receives a completion for the write to the primary storage 14. In process 56, the host 10 receives the completion from the primary controller 12. Processes 50 to 56 provide the primary write functions of the primary controller 12. An exemplary embodiment of the ARC controller 20 functions are defined in processes 58 to 70 as provided below.

In process 58, after receiving the write command from process 50, the ARC controller 20 buffers the write information in ARC buffer 22 in preparation for sending the write information to the remote controller 16. The ARC controller 20 and ARC buffer 22 may be included in the primary controller 12, in one embodiment. Such an implementation provides for low latency communications between primary storage 14 and ARC controller 20. Depending on implementation, the ARC controller 20 may be separate or part of the remote controller 16, for example.

In process 60, the ARC controller 20 monitors the status of the remote controller 16 and waits until the remote controller 16 is ready to accept write data. In process 62, the ARC controller 20 suppresses the release of the write data to the remote controller 16, if a series of delay thresholds 24 between receiving the write command at the primary controller 12 and the time when the remote controller 16 is able to accept the write data are over a threshold period 26, as discussed in further detail below.

More particularly, a series of delays, each over a delay threshold 24, may result in a cumulative delay that is over a threshold period 26 before the suppression is initiated. For example, suppression may occur if a series of remote delays, each over a threshold delay 24 of 1 ms, lasted for more than a threshold period 26 of 60 ms. In one embodiment, a user interface 30 allows a user to set values for the delay threshold 24 and for the period threshold 26. As such, the release of an ARC acknowledgement signal to the primary controller may be suppressed depending on the above-noted delay measurements.

In process 64, the ARC controller 20 releases the write data to the remote controller 16 and an acknowledgement signal is sent to the primary controller 14. In process 66, the remote controller 16 writes the data to the remote storage 18. In process 68, the write completion is sent from the remote storage 18. In process 70, the ARC controller receives the write completion. Once process 70 has occurred, the memory resources being used to remember the transaction at the primary may be re-used for another transaction. This drives the release of resources within the ARC controller which then permits further writes to be accepted at processes 58-60. Once the write data is written to the primary controller 14, the write completion acknowledgement is sent to host 10.

The above embodiments, thus advantageously address the problem of overloading at the remote controller in an ARC system. It will be clear to one of ordinary skill in the art that certain processes shown here in sequential fashion as they are numbered may in fact be processed concurrently, and that certain processes may be required to wait for the completion of other operations, and that the sequence shown is merely exemplary of the processing that may be performed by an embodiment of the present invention. For example, process 58 may be performed implicitly as part of process 50.

Note that the system disclosed above may also be implemented in a single controller by merging together the components and functions of the primary, remote and ARC controllers and simulating the messages between them in software. All or part of the method of the invention may suitably and usefully embodied in a logic apparatus, or a plurality of logic apparatus, comprising logic elements to perform the processes of the method, and that such logic elements may comprise hardware components, firmware components or a combination thereof.

All or part of a logic arrangement according to one or more embodiments may suitably be embodied in a logic apparatus comprising logic elements to perform the processes of method 100, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement provided herein may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

One or more embodiments may further suitably be implemented as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, using a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Such computer readable instructions may be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

An alternative embodiment may be realized in the form of a computer implemented method of deploying a service comprising processes of deploying computer program code operable to, when deployed into a computer infrastructure and executed thereon, cause the computer system to perform all or part of the processes of the method. Another embodiment may be realized in the form of a data carrier having functional data thereon, the functional data comprising functional computer data structures to, when loaded into a computer system and operated upon thereby, enable said computer system to perform one or more of the processes of method 100.

It will be clear to one skilled in the art that many improvements and modifications may be made to the foregoing exemplary embodiment without departing from the scope of the present invention.

The invention claimed is:

1. A system comprising:
 a primary controller configured to receive a write command and write data to a primary storage in a remote copy pair system;
 a remote controller configured to receive a write command and write data to a remote storage; and
 an asynchronous remote copying (ARC) controller configured to suppress release of a write command to said remote controller, in response to determining that a delay between receiving a write command and time when said remote storage is able to accept the data of a write command is more than a predetermined delay threshold;

wherein said primary controller suppresses recording data of a new write command in the primary storage until release of said new write command to said remote storage.

2. The system of claim 1, further comprising a timer configured to determine whether a delay is associated with consecutive multiple write commands.

3. The system of claim 2, wherein said timer is configured to determine whether a cumulative delay for said multiple write commands is greater than a predetermined delay threshold period.

4. The system of claim 1, further comprising a buffer to store write data associated with suppressed write commands.

5. The system of claim 1, further comprising a user interface configured to receive a user input of a value for a predetermined delay threshold.

6. The system of claim 1, further comprising a logic unit for storing one or more values for setting a predetermined delay threshold.

7. A computer program product comprising a tangible computer useable storage medium having a computer readable program stored thereon, wherein the computer readable program when executed on a computer causes the computer to:

send a primary write command to a primary controller to store write data to a primary storage;

send an asynchronous remote copy (ARC) write command to an ARC controller for storing a duplicate copy of said write data to a remote storage;

suppress release of said ARC command from said ARC controller, in response to determining that a delay between said step of sending said ARC write command to said ARC controller and the time when the remote storage is able to accept the data of a write command is more than a predetermined delay threshold; and store said write data at the primary storage in response to release of said ARC write command to said remote storage.

8. The computer program product of claim 7, wherein the computer readable program when executed on a computer further causes the computer to suppress said release of said ARC write command in response to determining that a series of write commands are associated with a cumulative delay beyond a predetermined delay threshold period.

9. The computer program product of claim 7, wherein the computer readable program when executed on a computer further causes the computer to allow a user to set values for said predetermined delay threshold.

10. A method for storing data in an asynchronous remote copy (ARC) system, the method comprising:

receiving a write request to write data to a primary storage;

buffering said write data, while monitoring a time delay associated with a primary controller receiving said write request until a remote controller indicates that said remote controller will write a copy of said write data to a remote storage; and writing said write data to said primary storage, in response to a determination that said time delay is less than a predetermined delay threshold:

writing a copy of said write data to said remote storage, in response to a determination that said time delay is less than said predetermined threshold; and suspending writing of said write data to said remote storage, in response to a determination that said time delay is greater than said predetermined threshold.

11. The method of claim 10, wherein said time delay is determined by tracking available resources.

12. The method of claim 10, wherein said time delay is determined by a cumulative time delay associated with time delays for multiple write requests.

13. The method of claim 10, further comprising suspending said step of writing said write data to said primary storage, in response to a determination that said time delay is greater than said predetermined threshold.

14. The method of claim 10, wherein said step of writing said write data to said primary storage is suspended until said determination that said time delay is less than said predetermined threshold.

15. The method of claim 10, wherein said step of writing said write data to said remote storage is suspended until said determination that said time delay is less than said predetermined threshold.

16. The method of claim 10, further comprising forwarding a write completion notice to said primary controller, in response to a determination that an ARC controller has released said write data to said remote controller.

17. The method of claim 10, further comprising forwarding a write completion notice to an ARC controller, in response to a determination that said write data has been written to said remote storage.

18. The method of claim 10, further comprising forwarding a write completion notice to a host submitting said write request, in response to a determination that said write data has been written to said primary storage.

* * * * *